Nov. 11, 1930.  E. M. SYMMES  1,780,952
VISCOSIMETER
Filed Sept. 27, 1927   2 Sheets-Sheet 1

WITNESS:

INVENTOR
Ernest M. Symmes
BY
ATTORNEYS.

Patented Nov. 11, 1930

1,780,952

UNITED STATES PATENT OFFICE

ERNEST M. SYMMES, OF WILMINGTON, DELAWARE, ASSIGNOR TO HERCULES POWDER COMPANY, OF WILMINGTON, DELAWARE, A CORPORATION OF DELAWARE

VISCOSIMETER

Application filed September 27, 1927. Serial No. 222,373.

My invention relates to an improvement in viscosimeters, such as, for example, are used for determining the viscosity of liquids and solutions.

Heretofore the viscosity of liquids and solutions has been determined by measuring the time required for a ball, as for example, a ball bearing ball, to pass under the influence of gravity between two points on a vertically positioned tube containing a column of the liquid or solution the viscosity of which is to be determined. Such a device has proved entirely satisfactory where the liquid or solution under test is clear so as to enable observation of the ball, but such a device is of no use where it is desired to determine the viscosity of an opaque liquid or solution. For example, such a device is of no use in determining the viscosity of an opaque liquid or solution, as a colored varnish, lacquer, or paint and the viscosity of such can only be approximated by determining the viscosity before addition of the pigment or coloring matter and making allowance for the effect of the addition of the pigment or coloring matter.

Now, it is the object of my invention to provide a viscosimeter so constructed that it may be utilized for determining the viscosity of liquids or solutions irrespective of their transparency or opacity and, at the same time, a viscosimeter which will enable more accurate determination of viscosity than has heretofore been possible.

Having now indicated, in a general way, the nature and purpose of my invention, I will proceed to a detailed description thereof with reference to the accompanying drawings in which there is illustrated a preferred embodiment and in which:—

Figure 1:
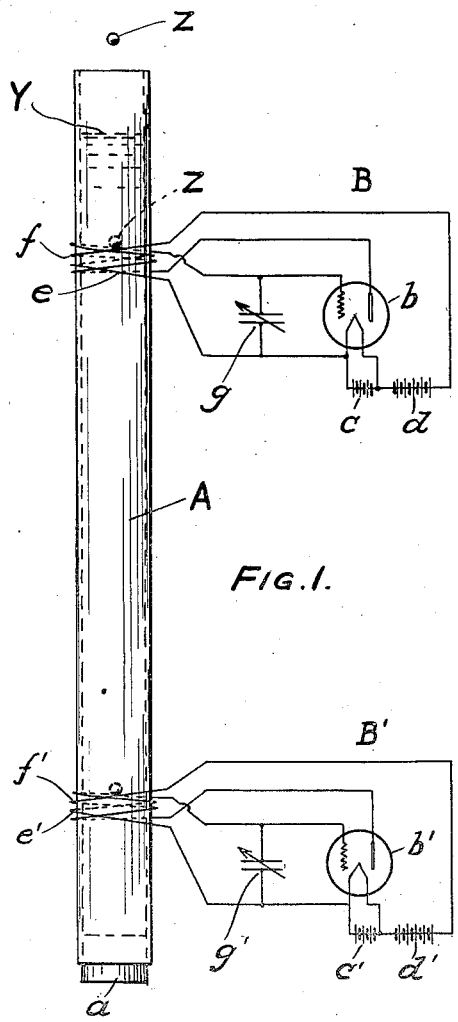
Fig. 1 is a diagrammatic view of a viscosimeter embodying my invention.

Referring now more particularly to Figure 1, A indicates a tube, for example of glass and such as is ordinarily used in viscosimeters. The tube A is positioned vertically, its upper end being open and its lower end being closed as with a plug $a$.

B and B' indicate radio tube oscillating circuits, comprising respectively radio tubes $b$, $b'$, of any convenient size or kind, connected with filament heating sources, as batteries $c$, $c'$, and sources of plate energizing voltage, as batteries $d$, $d'$. The circuits also include grid filament circuits $e$, $e'$, plate filament circuits $f$, $f'$, and variable capacities $g$, $g'$.

The grid filament circuits $e$, $e'$ of the circuits B, B' are wound about the tube A at separated points, say adjacent the upper and lower ends of the tubes, and the plate filament circuits $f$, $f'$ of the two circuits are wound around the tube at the same points as and on top of the grid filament circuits.

Figure 2:
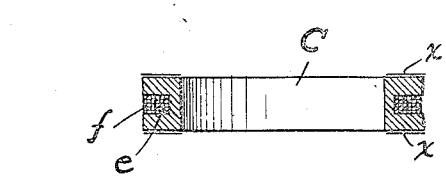
Fig. 2 is a sectional view of a detail of construction.
Figure 3:
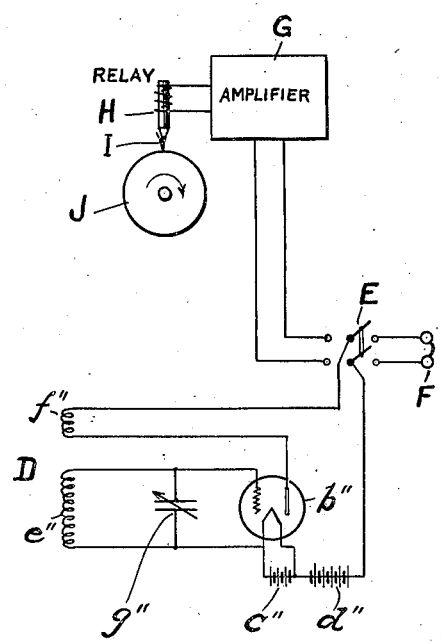
Fig. 3 is a plan view of the subject of Figure 2, device diagrammed in Figure 1.
Figure 3:
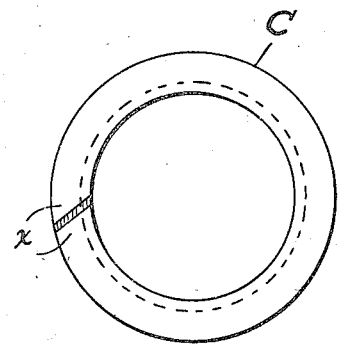

In winding the grid and plate filament circuits, about the tube A, the windings may be desirably supported in grooves formed in rings C (as shown in Figures 2 and 3) embracing the tube A at the desired points and having their upper and lower surfaces covered with metal foil X, the metal foil being noncontinuous, as indicated in Figure 3.

D indicates a radio receiving circuit which may by way of example be of any desired type which can maintain itself in sustained oscillation. As illustrated the receiving circuit D is similar to the circuits B and B' and comprises the same elements denoted by double primed similar reference letters. In the receiving circuit D the grid and plate filament circuits are connected to a switch E by manipulation of which the circuits may be connected to a set of head phones E, or to an amplifying circuit indicated at G, in turn connected, for example, to a polarized relay H adapted to actuate the stylus I, in association with a rotatable cylinder J.

It will now be observed that the radio tubes $b$, $b'$ on the circuits B, B' will oscillate on account of the regeneration or so-called feed back of the plate filament circuit to the grid filament circuit. The rate of oscillation of the tubes $b$, $b'$ will depend upon the characteristics of the tubes and the degree of feed back between the two coils, the rate of oscillation, however, will be constant so long as conditions remain constant and the oscillating electrical field will spread out from the circuits into the surrounding ether and will be picked up by the detector tube $b''$ of the radio receiving circuit D which is within the field of the electrical oscillation. The oscillation will become audible as a whistle, squeal or the like in the head phones F, if they be connected by switch E within the circuit D, and the circuit tuned to a point where an interfering or beat note is produced. The whistle, squeal, or the like, will remain constant so long as conditions remain constant.

For example assuming that the tubes $b, b'$ are of the same character and the same feed back exists in the circuits B, B', and that the tubes are oscillating at, for example, 1,000,000 cycles per second, when the receiving circuit D is tuned to an oscillating condition of, say 1,001,000 cycles per second, it will absorb some of the energy from the circuits B, B' and produce in the head phones a high pitched note of 1,000 vibrations per second, or the difference between the rates of oscillation of the circuits B, B' and the circuit D.

Figure 4:
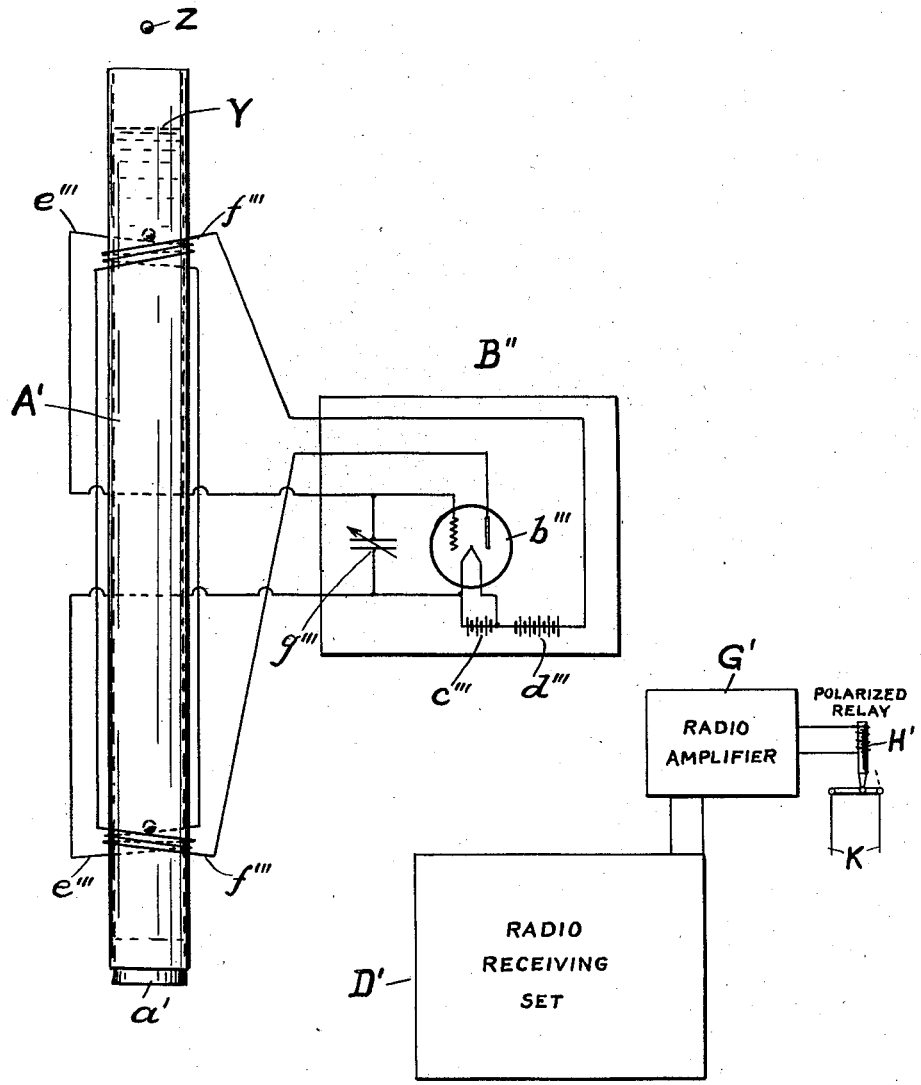
Fig. 4 is a diagrammatic view of a modification of the device diagrammed in Figure 1.

Referring now more particularly to Figure 4, in which is shown a modification of my invention, the device comprises a viscosimeter tube A', open at the top and closed at the bottom with a plug $a''$. A radio tube oscillating circuit B'', comprising a radio tube $b'''$, connected with a filament heating source $c'''$, a source of plate energizing voltage $d'''$, a grid filament circuit $e'''$, a plate filament circuit $f'''$ and variable capacity $g'''$. In the device of Figure 4 the grid filament circuits and the plate filament circuit are divided, part of each being wound over the other about the tube A' at points adjacent the upper and lower ends of the tube. Within the field of oscillation of the tube $b'''$ is placed a radio receiving set D', such for example as is illustrated in some detail in Figure 1, and which may be connected to head phones as in Figure 1, or through a radio amplifier G', the amplified current being utilized to actuate, for example, a recording or indicating device by control of a circuit K, through the medium of a polarized relay H'.

It will now be appreciated that if any change in conditions in the circuits B, B', or in circuit B'', as shown in Figures 1 and 4, occur that the rate of oscillation of the tubes $b, b'$ or $b'''$ will change with consequent change in the sound produced in the head phones F, or F' or actuation of the polarized relay H, or H'.

In the operation of the device as illustrated in Figure 1, the tube A is filled with the liquid or solution Y, the viscosity of which is to be determined, and a ball Z, as a ball bearing ball of substantially less diameter than that of the tube, dropped into the open end of the tube. The ball Z will fall through the solution Y under the influence of gravity at a rate depending upon the viscosity of the solution. When the ball passes the field of the grid and plate filament circuits $e, f$, it will cause interference with the circuit B and cause a change in the rate of oscillation of the tube $b$ which may be noted in the head phones F, if they be connected to the receiving set D, or which may be utilized through the medium of the amplifier G, polarized relay H and stylus I to record on the cylinder J.

The interference caused by the ball Z will cease when the ball passes out of the field of the circuits $e, f$ and will again arise, causing a change in the rate of oscillation of the tube $b'$ of circuit B', when the ball enters the field of the grid and plate filament circuits of the circuit B', and which will be indicated through the medium of the receiving set D. Hence the viscosity of a liquid or solution in the tube A may be readily determined by an operator at the head phones F, who may note the time required for the ball Z to pass from the point of location of the circuits $e, f$ of the oscillating circuit B to the point of location of the circuits $e', f'$ of the oscillating circuit B', or the time may be obtained automatically by the use of the stylus I and cylinder J the speed of rotation which would be known and which, or a sheet supported thereon, would be calibrated so that the time would be readily determined by the distance between points of record by the stylus thereon, the stylus being actuated under the influence of change in the rate of oscillation of the circuits B and B'.

The operation of the device as illustrated in Figure 4 will, it is believed, be clear it being obvious that the rate of oscillation of the tube $b'''$ will change when the passage of the ball Z through the fields of divided circuits $e''', f'''$.

With reference to Figures 2 and 3 it will be understood that if the windings of the grid and plate filament circuits be confined vertically, of the tube A or A', as in groove $f$ of ring C, and the vertical extent of the fields thereof be limited by the metal foil X, the upper and lower limits of the field will be sharply defined and the vertical extent of the field will be small so that the interference with the circuits B, B' or the circuit B'' by the ball Z will be of minimum duration, enabling the ball to be timed substantially between the vertical spaced points on the tubes.

It will be understood that I do not intend that my invention shall be limited to the specific devices illustrated and described herein since it will be understood that various modifications thereof may be made without departing from my invention, and it will be understood that in accordance with my invention the variations in the rates of oscillation of the radio tubes may be noted or recorded in any manner in connection with any suitable apparatus for producing audible sound, or for recording, or indicating the variations in rate of oscillation.

Having now fully described my invention, what I claim and desire to protect by Letters Patent is:

1. Apparatus for determining the viscosity of a fluid comprising a viscosimeter tube open for the reception of a fluid, a radio circuit including an oscillating radio tube having grid and plate filament circuits, the said grid and plate filament circuits extending about said viscosimeter tube, means for detecting variation in the rate of oscillation of said radio tube, and means for limiting the field of said grid and plate filament circuits adjacent to said tube.

2. Apparatus for determining the viscosity of a fluid comprising a viscosimeter tube open for the reception of a fluid, a radio circuit including an oscillating radio tube having grid and plate filament circuits, the said grid and plate filament circuits being divided and extending about said viscosimeter tube at points spaced from one another, means for detecting variation in the rate of oscillation of said radio tube, an electrically conductive body for entry into said viscosimeter tube for passage through a fluid therein and which on passage through the field of said grid and plate filament circuits, causes variation in the rate of oscillation of said radio tube.

3. Apparatus for determining the viscosity of a fluid comprising a viscosimeter tube open for the reception of a fluid, a plurality of radio circuits including oscillating radio tubes having grid and plate filament circuits, the said grid and plate filament circuits of the radio circuits respectively extending about said viscosimeter tube at points spaced from one another, an electrically conductive body adapted for passage through liquid in said tube and means for detecting variation in the rate of oscillation of said radio tubes.

4. Apparatus for determining the viscosity of a fluid comprising a viscosimeter tube open for the reception of a fluid, a radio circuit, including an oscillating radio tube having grid and plate filament circuits, the said grid and plate filament circuits extending about said viscosimeter tube, means for amplifying the energy resulting from variation in the rate of oscillation of said radio tube and means for utilizing the amplified energy to actuate an indicating device.

In testimony of which invention, I have hereunto set my hand, at Wilmington, Delaware, on this 24th day of Sept., 1927.

ERNEST M. SYMMES.